Figure 1:
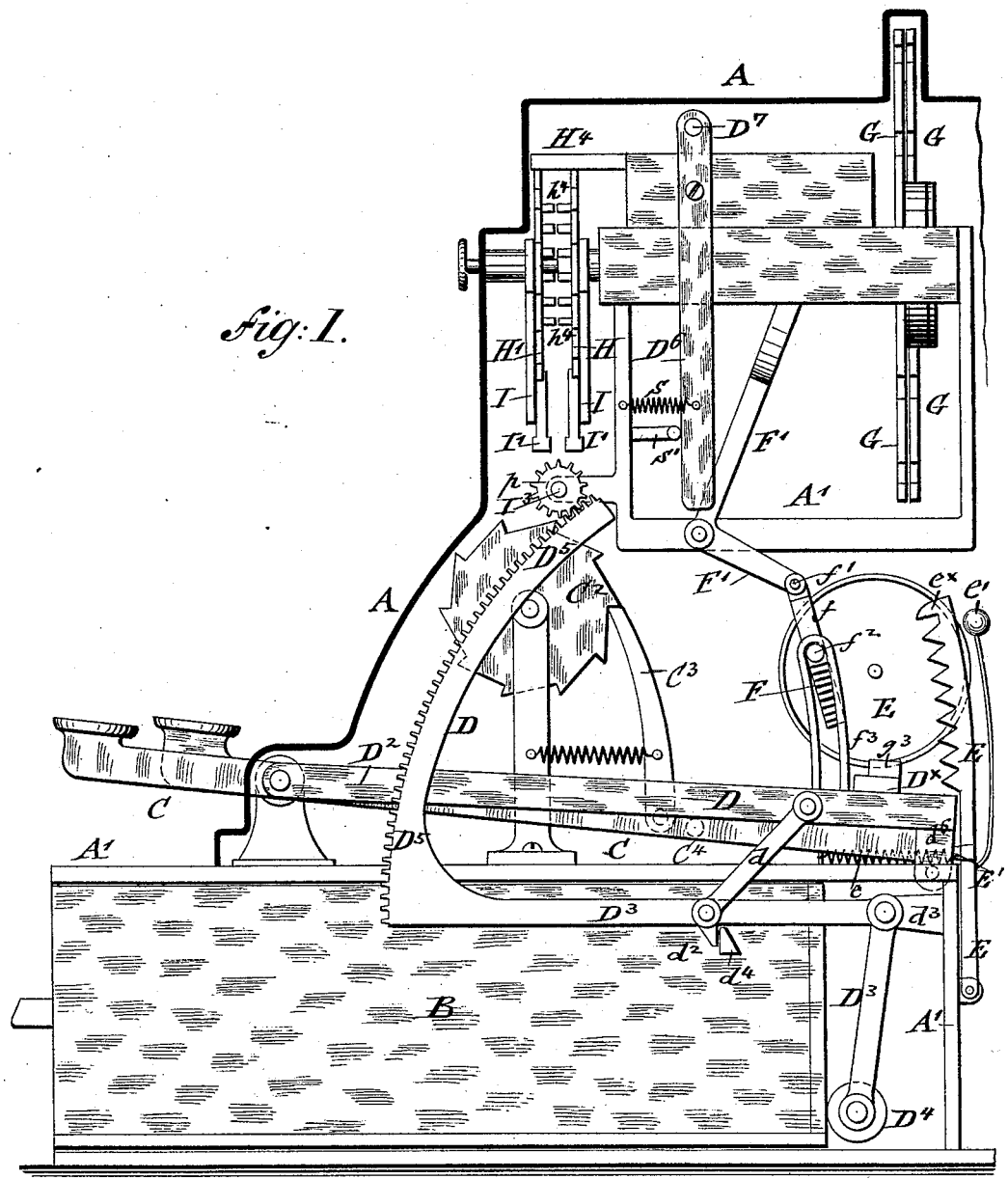

(No Model.) 8 Sheets—Sheet 1.
E. DEL VALLE.
CASH REGISTER AND INDICATOR.

No. 486,825. Patented Nov. 22, 1892.

WITNESSES:
A. Schehl.
Charles Ples.

INVENTOR
Eliseo del Valle
BY
Goepel Raegener
ATTORNEYS.

(No Model.) 8 Sheets—Sheet 2.
E. DEL VALLE.
CASH REGISTER AND INDICATOR.

No. 486,825. Patented Nov. 22, 1892.

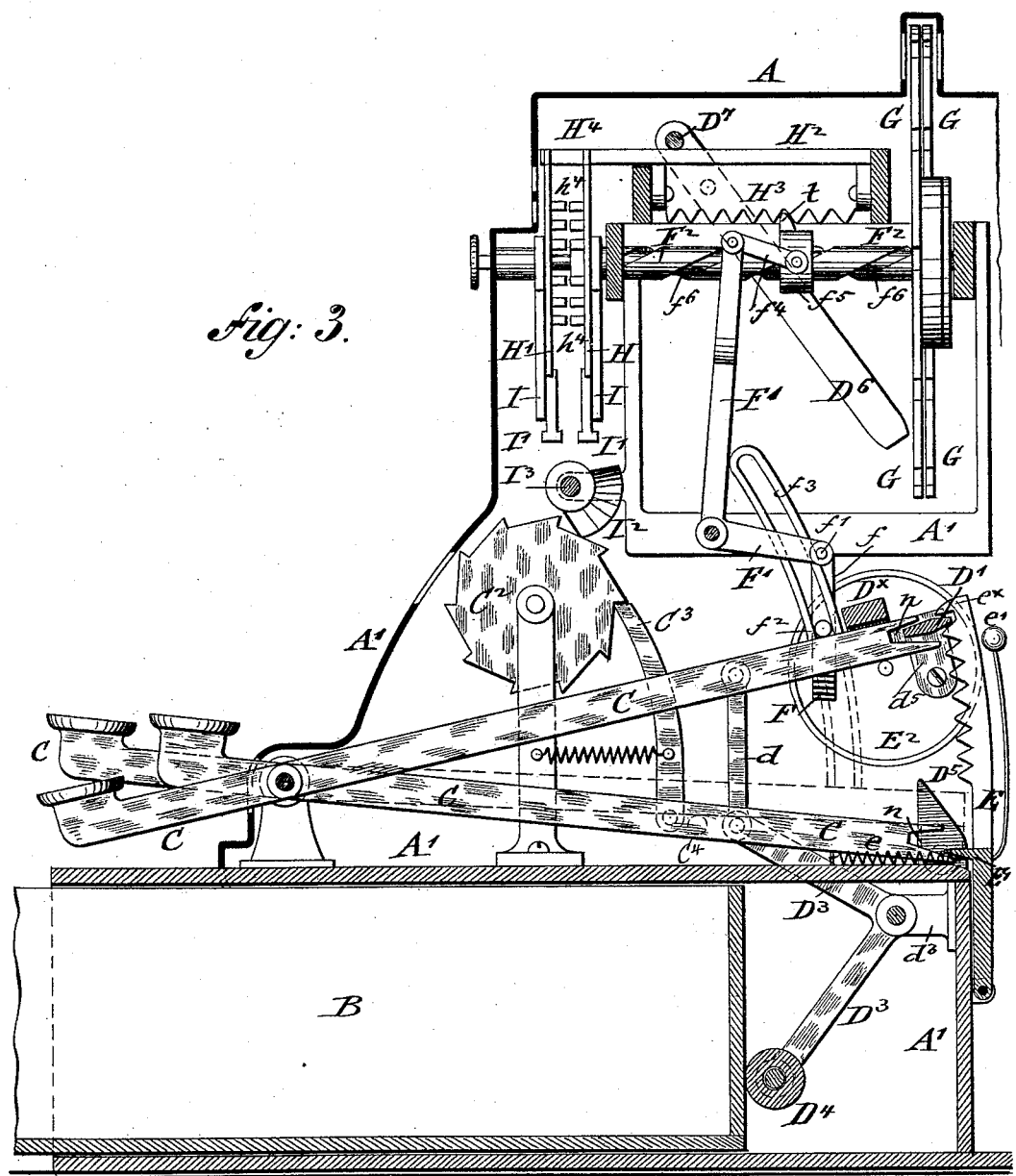

(No Model.)   8 Sheets—Sheet 4.

E. DEL VALLE.
CASH REGISTER AND INDICATOR.

No. 486,825.   Patented Nov. 22, 1892.

WITNESSES:   INVENTOR
A. Schehl.   Eliseo del Valle
Charles O. Ples.   BY
   ATTORNEYS.

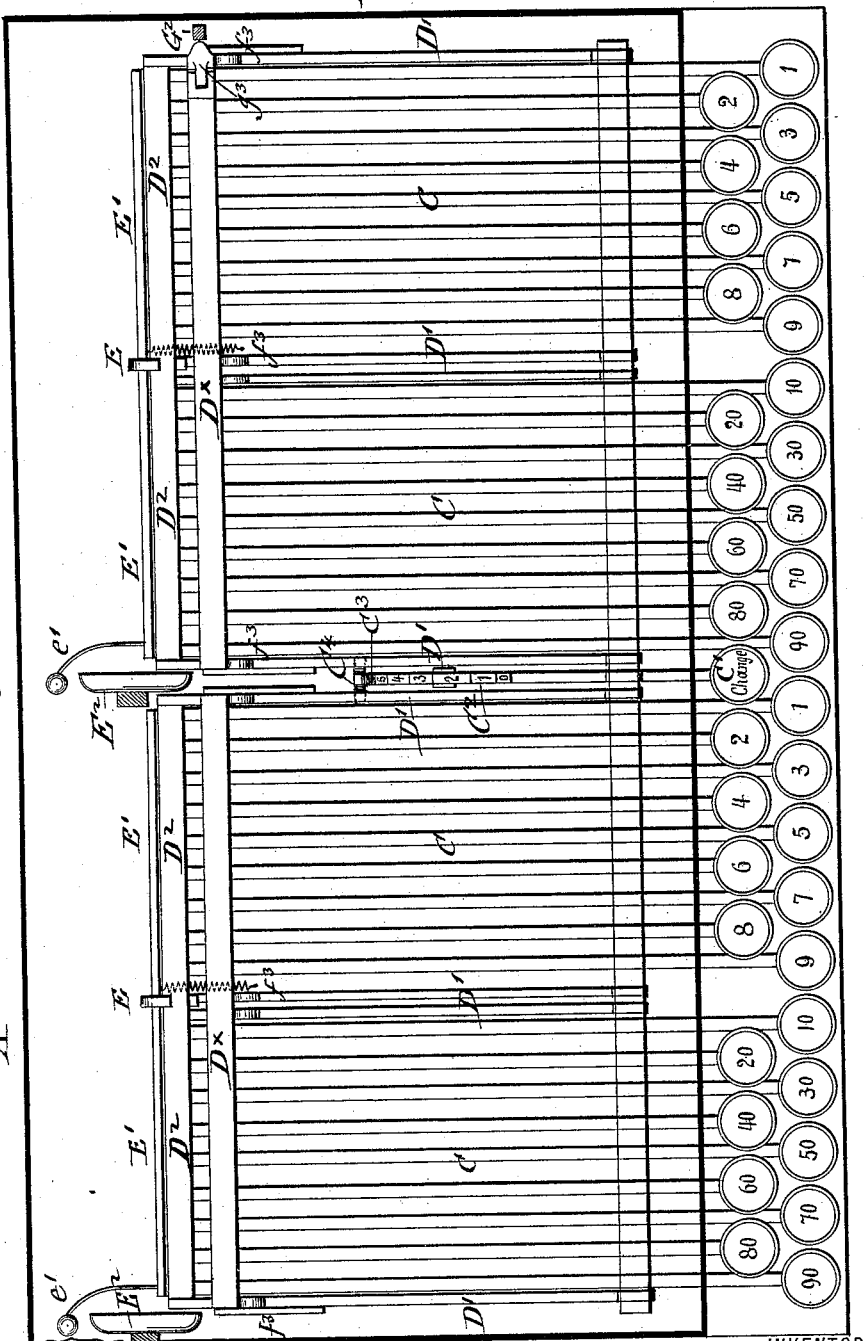

(No Model.) 8 Sheets—Sheet 6.
E. DEL VALLE.
CASH REGISTER AND INDICATOR.
No. 486,825. Patented Nov. 22, 1892.
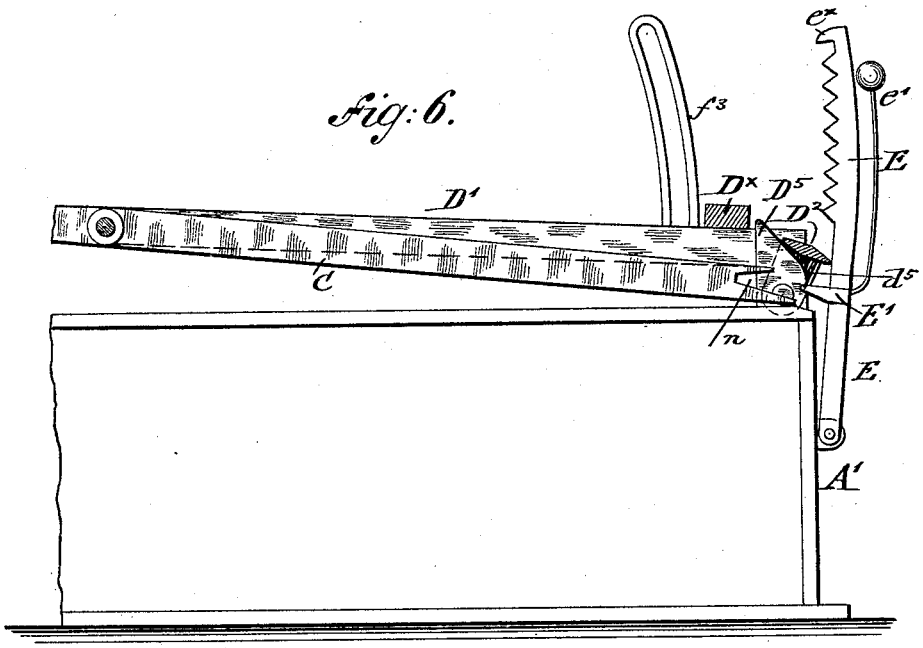
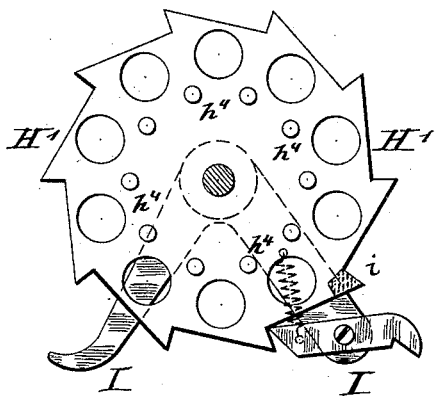
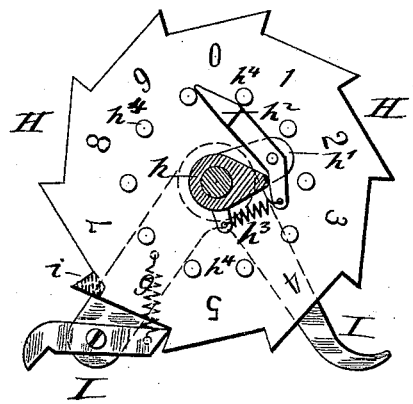
WITNESSES:
A. Schehl.
Charles Bles.
INVENTOR
Eliseo del Valle
BY Gospel Raegener
ATTORNEYS.

(No Model.) 8 Sheets—Sheet 7.
E. DEL VALLE.
CASH REGISTER AND INDICATOR.

No. 486,825. Patented Nov. 22, 1892.

WITNESSES: INVENTOR (No Model.) 8 Sheets—Sheet 8.
E. DEL VALLE.
CASH REGISTER AND INDICATOR.
No. 486,825. Patented Nov. 22, 1892.
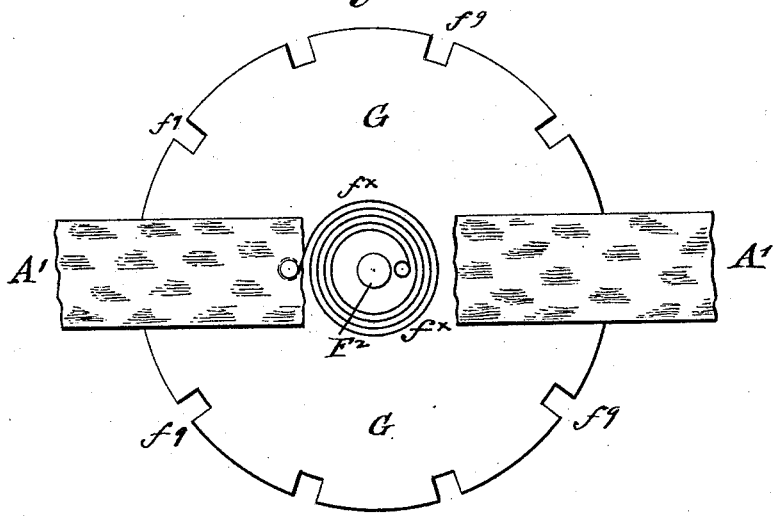
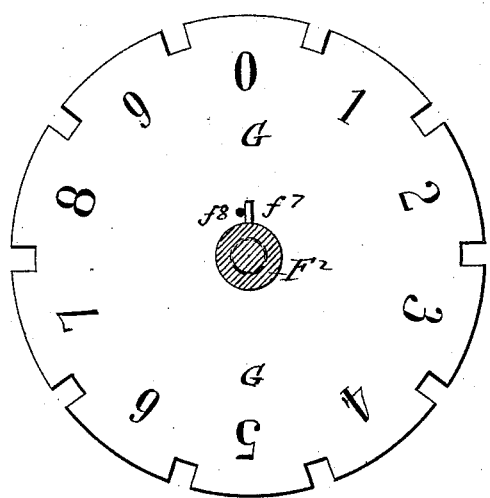 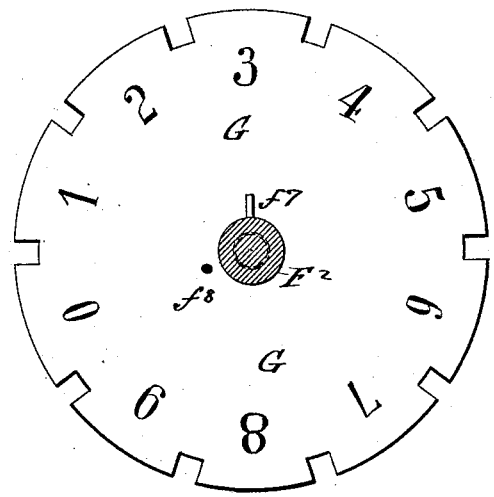
WITNESSES:
A. Schehl.
Charles Bles
INVENTOR
Eliseo del Valle
BY
Gospel Raegener
ATTORNEYS.

UNITED STATES PATENT OFFICE.

ELISEO DEL VALLE, OF BROOKLYN, NEW YORK, ASSIGNOR OF THREE-TENTHS TO GEORGE MARTENS, OF SAME PLACE.

CASH REGISTER AND INDICATOR.

SPECIFICATION forming part of Letters Patent No. 486,825, dated November 22, 1892.

Application filed August 18, 1891. Serial No. 402,986. (No model.)

*To all whom it may concern:*

Be it known that I, ELISEO DEL VALLE, a citizen of the Kingdom of Spain, residing at Brooklyn, in the county of Kings and State of New York, have invented certain new and useful Improvements in Cash Registers and Indicators, of which the following is a specification.

This invention relates to an improved cash register and indicator of that class which is used in keeping account of cash received from sales and which is operated by means of keys in connection with several drawers in which the money received from the sales is collected.
The object of my invention is more especially to provide a cash registering and indicating machine which shall temporarily indicate the amount of each sale, so that the customer may see the same as it appears at the rear part of the machine and which shall, in addition to the temporary indication thus made, transfer the amount of said sale by a process of addition primarily to a permanent totalizing-register, which is inaccessible to the salesman and which will at all times show the sum total of the sales without any calculation upon the part of the owner, and, secondarily, to a shiftable registering device by which the sales during a certain period of time—be it for a day, week, or month—are totalized, and which registering device is capable of being returned to its starting-point, so as to begin a new operation for each period of time. The machine includes, further, mechanism whereby upon the opening of the cash-drawer by the return of the keys the temporary indicating mechanism will be placed into proper position, remain stationary in this position until the next sale is made and the drawer again operated, upon which the temporary indicator is returned to its natural position and reset immediately to indicate the amount of the sale.

The invention is, fourthly, designed to provide a construction which shall be very effective in action and positive in operation, which permits the making of change without interfering with the different registering and indicating operations, and in which the different operations are performed in a reliable and accurate manner, so that a cash registering and indicating machine is obtained that is adapted for all kinds of business in which a sufficient amount of sales are made in the course of a business day to warrant the purchase of a registering-machine of this kind.

With these ends in view my invention consists in the construction and combination of the operative elements hereinafter to be described, and finally cited in the claims, by which the temporary indication of the different cash sales, the permanent totalizing, and a temporary totalizing of the same for a certain determined period of time is produced.

In order to more fully describe my improved cash registering and indicating machine, reference is made to the accompanying drawings, in which—

Figure 4:
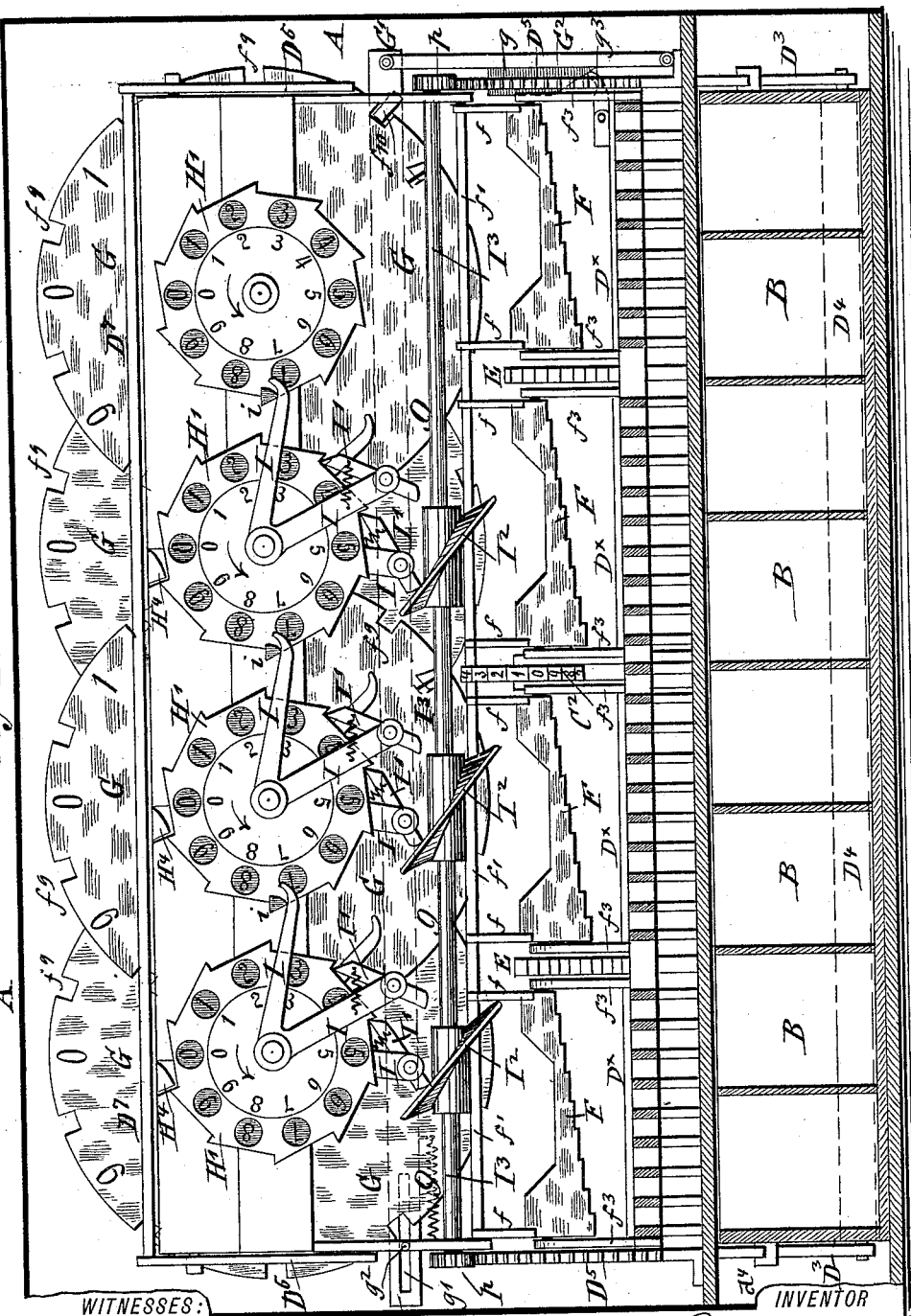
Figure 9:
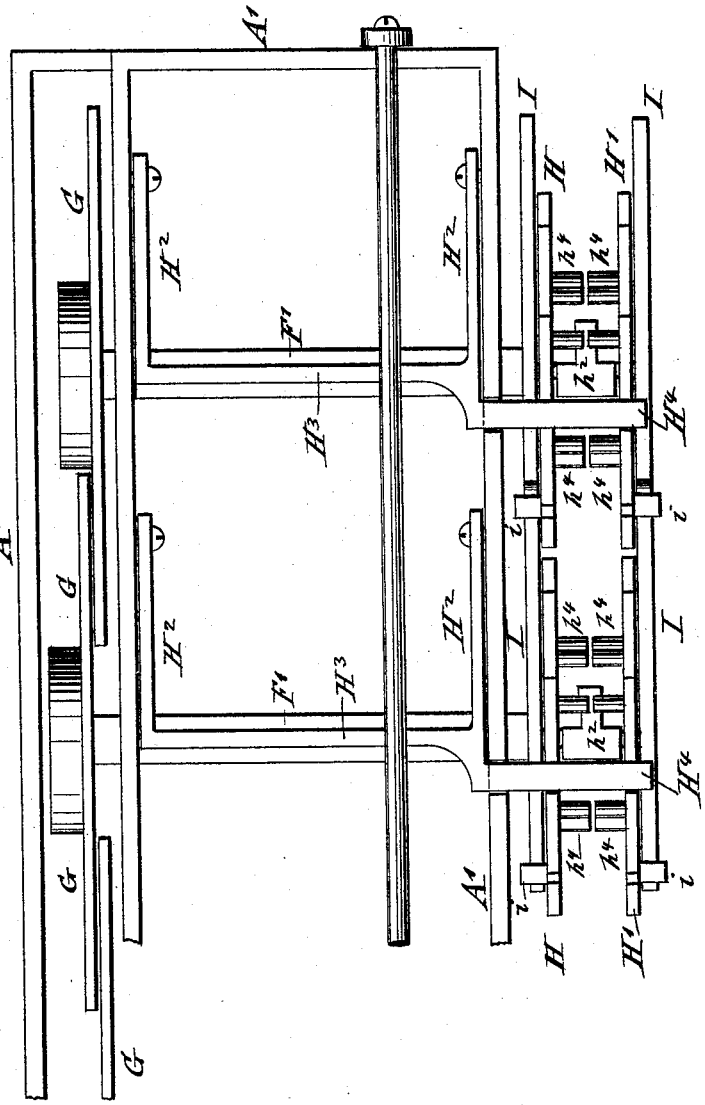

Figure 1 represents a sectional side elevation of the machine, showing the operating 70 parts of the same in normally-closed position. Fig. 2 is also a sectional side elevation showing one of the keys depressed and the cash-drawer open for receiving the amount of the sale. Fig. 3 is a vertical longitudinal section showing one of the keys depressed and the mechanism by which the temporary indicator and the totalizing-registers are operated. Fig. 4 is a front elevation of the machine, partly in longitudinal section, showing the indicating and registering dials. Fig. 5 is a plan of the lower part of the machine, showing the keyboard, the alarm devices, and the change-indicator. Fig. 6 is a detail side elevation of the locking and coupling devices for the key-levers. Figs. 7 and 8 are respectively a front view and a rear view of one of the permanent totalizing-registers and of one of the temporary totalizing-registers. Fig. 9 is a plan of a part of the frame, showing the check devices of the temporary indicators and the permanent and temporary totalizing-registers; and Figs. 10, 11, and 12 are respectively a rear view and two front views of the temporary indicators, showing the same in different postions before and after each indication.

Like letters of reference denote the same parts in all the figures of the drawings.

Referring to the drawings, A represents the casing in which my improved cash registering and indicating machine is inclosed. At the lower part of the casing A are arranged two cash-drawers B B, which are guided in suitable ways of the supporting-frame A' of the machine and which are opened by the depression of any one or more of the key-levers C, which are loosely mounted on a fixed shaft and provided with keys that correspond to the units and tens of the fraction of a coin unit and the units and tens of said coin unit, one drawer being provided for the fractions of said coin unit and a separate drawer for the multiples of said coin unit. The key-levers C are arranged parallel with each other and bent in upward direction at their front ends, to which ends the keys are attached, said keys being arranged in two longitudinal rows—one for the even, the other for the uneven numbers—and in four groups, respectively, for the units and tens keys of the fractions of the coin unit, and the units and tens keys of the coin unit, as shown in Fig. 5. Between the two groups of keys representing the fractional and multiple parts of the coin unit is arranged a change-key C', which operates a change-indicating register $C^2$, by which is registered the number of times that change has been made from the cash-drawers. Each key-lever C is provided at its rear end with a V-shaped notch $n$, that is engaged by the transverse rear bar D' of a U-shaped coupling-frame D, the side bars $D^2$ of which extend parallel with the key-levers and are pivoted to the shaft of the same. The side bars $D^2$ of the coupling-frame D are connected by pivot-links $d$ with elbow-levers $D^3$, that are fulcrumed to projecting brackets $d^3$ at the rear part of the supporting-frame A' and that are provided at their lower ends with a push-roller $D^4$, which presses against the rear part of the cash-drawer B and pushes the same in forward direction whenever one of the keys is depressed. A projecting stop $d^2$ on the upper arm of each elbow-lever $D^3$ engages a fixed abutment $d^4$ on the side wall of the cash-drawer B and locks the same in closed position when the keys and the coupling-frame are in their normal positions, as shown in Fig. 1. As soon as any one of the keys is depressed the coupling-frame D is lifted, as the rear part of the key engages a transverse connecting-bar $D^\times$ of the coupling-frame D, so that the upper arms of the elbow-levers $D^3$ are moved by the pivot-links $d$ into raised position, while the stop $d'$ is simultaneously moved out of the path of the abutment $d^2$ on the cash-drawer, so as not to obstruct the forward movement of the latter, which is caused by the action of the push-roller $D^4$ on the drawer by the forward motion of the lower arms of the elbow-levers D, whereby the cash-drawer is opened sufficiently to permit the drawing out of the same and the inserting of the cash obtained from the sale. The position of the elbow-levers and cash-drawer when one of the keys is depressed is clearly shown in Fig. 2.

To the rear part of the supporting-frame A' of the machine is pivoted at the center of each coupling-frame D an upwardly-extending and toothed arm E, which is connected by a helical spring $e$ with a fixed pin of the supporting-frame A' and which is provided at its lower part or shank with a transverse locking-bar E', that serves to engage the notched ends of all keys C, which are in their normal or undepressed position, as soon as the coupling-frame D is lifted by the key-lever of a depressed key. To one end of the locking-bar E' is applied a spring-hammer $e'$, which at each depression of a key strikes a fixed bell $E^2$ by the action of the helical spring $e$ on the toothed arm E. By the depression of a key and the lifting of the rear end of its key-lever C the rear bar D' of the coupling-frame D is carried along by the key-lever and passed over the teeth of the arm E, so as to vibrate the same and cause the ringing of the bell, both during the up and down motion of the coupling-frame, so as to indicate thereby the opening or closing of the drawer B. When the coupling-frame arrives at the uppermost end of the arm E, its motion and the motion of the key-lever are arrested by a stop-tooth $e^\times$ at the upper end of the arm E, which tooth also locks the coupling-frame and by the same the key-lever in raised position, as shown clearly in Figs. 2 and 3. The key-lever C is retained in its raised position by the toothed arm, while simultaneously all the remaining key-levers are locked in their normal positions by the transverse locking-bar E', which engages the notched rear ends of the undepressed key-levers C. As soon as the cash received from the sale is placed in the drawer the latter is pushed home into its normal position, which motion operates the elbow-levers $D^3$ and returns thereby the key-lever C and the coupling-frame into their normal positions, the latter passing along the toothed arm, so as to vibrate the same and give thereby the closing alarm. The rear bar D' of the coupling-frame D is pivoted by end lugs $d^5$ to lugs $d^6$ of the side bars $D^2$, so that when the key-levers C and the coupling-frame D are returned into their normal positions the rear bar D' passes along the inclined face of a fixed abutment $D^5$, (shown in Figs. 2, 3, and 6,) and is thereby oscillated and moved in backward direction, so as to press against the shank of the toothed and spring-actuated arm E and push the same in backward direction, as shown in Fig. 6, whereby the rear end of the key-lever just returned is released from the coupling-frame and the locking-bar E released from the other key-levers C, so that all key-levers are ready for being depressed for indicating the next sale. As soon as a key is depressed the key-lever lifts the coupling-frame D, so that the rear bar D' clears the abutment and engages the notched end of the key-lever, while the locking-bar E' engages the notched ends of the remaining key-levers and locks them in position.

Above the rear part of each group of key-levers, which represents either the units or tens of the fractions of a coin unit or the units or tens of the coin unit, is arranged a transverse block F, that is suspended by arms $f$ from a pivot $f'$ at the lower end of an elbow-lever F', which is fulcrumed to the supporting-frame A', as shown clearly in Figs. 1, 2, and 3. The lower edge of each block F is provided with as many steps as there are keys in its respective group—that is to say, nine steps for each group of nine keys. The stepped blocks F assume a slightly backwardly-inclined position when the parts are in normal position, as shown in Fig. 1. Each block F is provided with pivot-pins $f^2$ at its end, which are engaged by slotted and arc-shaped arms $f^3$, that are attached to the side bars of the coupling-frame and serve to hold the block F in position and to return the same into its lowermost position on the return of the coupling-frame D. The upper ends of the elbow-levers F' are made fork-shaped and connected by pivot-links $f^4$ with transversing nuts $f^5$, which engage the spiral grooves $f^6$ of horizontal spindles $F^2$, that are supported in bearings at the upper part of the supporting-frame A' of the machine. To the rear end of each spindle $F^2$ is applied a temporary indicator or dial G, which turns loosely on the said spindle and which is provided with the figures from "1" to "9" at its front and rear faces. Each temporary indicator G is connected by a spiral or other spring $f^\times$ with the fixed pin on the frame, as shown in Fig. 10, so that when the spindle $F^2$ is turned on its axis by the transmitting mechanism before described a fixed pin $f^7$ on the spindle $F^2$ engages a fixed pin $f^8$ on the temporary indicator G and moves the same along, turning it on its axis until the figure that tallies with the figure on the key which has been depressed appears in the opening at the front or rear of the casing of the machine, so as to indicate correctly the amount of the sale. The circumference of each temporary indicator G is provided with as many recesses $f^9$ as there are figures, as shown clearly in Figs. 10, 11, and 12, said recesses being arranged intermediately between the figures and serving for being engaged by a check-pawl $f^{10}$, that is applied to a horizontal bar G', which is pivoted at one end to an upright oscillating bar $G^2$, that carries a laterally-projecting abutment $g$, while the other end of the horizontal bar G' is guided by a longitudinal slot $g'$ on a fixed pin $g^2$ of the supporting-frame of the machine, as shown clearly in Fig. 4. A push-pawl $g^3$ on the cross-bar $D^\times$ of the coupling-frame D passes along the inclined lower edge of the abutment $g$ when the coupling-frame is lifted by the pressure of a key and presses thereby the pivot-bar $G^2$ sidewise, so as to shift the horizontal bar G' and withdraw the check-pawls $f^{10}$ from the recesses $f^9$ of the temporary indicators G. The indicators on being thus released are free to follow the motion of the spindles $F^2$ by the action of the pins $f^7$ and $f^8$, so that their spiral springs are set to tension. This action has to take place before the key-levers act on one of the steps of the blocks, as it is necessary to release the temporary indicators before they can follow the axial motion of the spindles $F^2$. As soon as the coupling-frame D is returned with the key-lever the check-pawl $f^{10}$ engages the corresponding recess $f^9$ of the indicator and locks the latter thereby into the position to which it was set, the indicator showing the number to which it has been moved by the action of the key through openings in the casing A, as shown in Fig. 3. The indicator G is retained in this position until the next key is depressed, when the push-pawl of the coupling-frame by its action on the upright oscillating bar $G^2$ actuates the horizontal bar G' with its check-pawl $f^{10}$, so as to release the temporary indicator and permit it to be returned to zero by the action of its spiral spring $f^\times$.

On depressing a key the rear part of the key-lever engages the corresponding step of its block F and produces thereby a proportionate lifting of the block, according as a higher or lower step of the block is engaged by the key-lever. The degree of lifting motion of each block F is so proportioned that its transmitting elbow-lever F' imparts a corresponding axial motion to the disk-carrying spindle $F^2$, each step corresponding to one-tenth of the circumference of the indicator-dial and furnishing thereby a means by which the elbow-lever F' is oscillated and the spindle and the indicator-dial on the same is turned. On the return of the key-lever C the pressure on the stepped block F is released and the same returned into its normally-inclined position, as shown in Fig. 1, by the backward motion of the drawer and the return motion of the coupling-frame, which actuates by its arc-shaped arms the stepped block F and the fulcrumed elbow-lever F' and returns thereby the actuating-nut and its spindle $F^2$ to their normal positions without carrying the temporary indicators back with the same.

To the front end of each spindle $F^2$ are applied two registering-dials H and H', which are made of the same size, both being applied loosely to the spindle. The dial H serves as a permanent totalizing-register, while the dial H' serves as a temporary totalizing-register. Intermediately between the dials H and H' is arranged on each spindle $F^2$ a fixed sleeve $h$, (shown in Fig. 7,) to a lug $h'$ of which is applied a pivot-pawl $h^2$, that is made wider at its outer end, said pawl being connected by a spring $h^3$ at its rear end with a projection on said sleeve. The wider and beveled outer end of the pawl $h^2$ engages pins $h^4$, which project from the adjacent sides of the dials H and H', ten pins being arranged on each dial H and H'. By the axial motion of the spindle $F^2$ the pawl $h^2$ is pushed in between two adjoining pins $h^4$ on both dials, so that both are moved with the spindle for a distance corresponding to the motion of the stepped block F by the action of one of the key-levers on the same. On the return motion of the spindle the pawl $h^4$ follows the motion of the spindle and releases the pins, so that the dials H and H' are retained in the position to which they were set by the pawl. In other words, the dials follow the axial motion of the spindle in one direction, but do not follow the return motion of the spindle. To prevent the shifting of the dials H and H' when the spindle $F^2$ is returned to its normal position, they are engaged by a check-frame $H^2$, which is pivoted to the upper part of the supporting-frame A', as shown in Fig. 9, and which is composed of a middle portion that is serrated at its lower edge and of a forward-extending portion or check-pawl $H^4$, that engages teeth at the circumference of the dials H and H', as shown in Fig. 9, so as to retain the latter as soon as they are placed into their proper position and prevent them from following the return motion of the spindle $F^2$. The locking of the check-frame $H^2$ to the disks H and H', which is necessary for preventing the disks from following the motion of the actuating-spindle $F^2$, is produced by a toothed segment $D^5$ at the front end of the elbow-lever $D^3$, the upper end of said segment striking a fulcrumed and spring-actuated arm $D^6$, which is connected to a longitudinal bar $D^7$, that is pressed down on the check-frame $H^2$, as shown in Figs. 2, 3, and 9, as soon as the dials arrive in their proper positions. Before the bar $D^7$ is applied to the check-frame $H^2$ the dials H and H' move with the spindle $F^2$ in the direction of the arrows, Fig. 4, while a tooth $t$ on the nut $f^5$ moves along the serrated middle portion $H^3$ of the check-frame and vibrates the latter until the motion of the nut is completed and the same locked by the action of the bar $D^7$ on the check-frame $H^2$. As soon as the actuating key-lever is returned the toothed segment is also returned to its former position, so that the fulcrumed arm $D^6$ is released and returned by a spiral spring $s$ against a stop $s'$ of the supporting-frame A', as shown in Fig. 1. The release of the check-frame $H^2$ permits the tooth of the nut $f^5$ to pass back along the serrated portion of the check-frame as the same "gives" sufficiently for permitting the passage of the tooth, but without entirely withdrawing the pawl $H^4$ from the dials H and H', which are retained in position. Both dials H and H' are provided with transmitting devices, by means of which a complete rotation of one dial is transmitted to the next adjacent dial. For this purpose each dial H and H' is provided at one point of its circumference with a fixed projection $i$, which serves to engage the upper arm of an elbow-lever I, that is placed loosely on the spindle, one back of the dial H and the other in front of the dial H'. To the lower arm of the elbow-lever I is pivoted a push-pawl I', that is retained in engagement with the teeth at the circumference of the dials by a suitable spring, as shown in Figs. 7 and 8. The push-pawls I' of the elbow-levers I are moved by the projections $i$ on the dials H and H' into the path of spirally-bent wings or flanges $I^2$ on a shaft $I^3$, that extends longitudinally below the dials H H', and which is provided with pinions $p$ at its ends that intermesh with the toothed segments $D^5$ of the elbow-levers $D^3$. The pinions $p$ are placed loosely on the shaft $I^3$ and locked thereto by a clutch-pawl and ratchet-wheel or other mechanism in one direction, while moving freely thereon when turned in the opposite direction, so that at each upward motion of the toothed segments the shaft $I^3$ is turned, and thereby by the action of the spiral wings and flanges the pawls I' pressed against the lower ends of the elbow-levers, which are then in the path of said wings, so as to push the same in upward direction, set thereby the dial, and register every full rotation of the adjacent dial on the same. After each rotation of a dial the elbow-lever I of the next adjacent dial is moved downward, so that its pawl is in the path of the wings, while the turning of the second dial and the return of the elbow-lever I to its former position is produced by the action of the shaft $I^3$ and its wings $I^2$. In this manner the total amount of the sales is registered on the dials. The front dials H' are provided with a number of openings arranged in a circle in front of the figures on the rear dials H, through which openings the figures on the rear dials can be read off readily, the rear dials H serving as a permanent totalizing-register, by which the sum of all the sales is indicated which are made since the machine is started, while the front dials H' are used as a temporary totalizing-register and are returned to their zero-points after a day, week, month, or other period of time, so as to indicate the total amount of business done within said period. The front dials are returned to their zero-points by means of a button or other device that is attached to the front ends of their hubs when the period of time for which the temporary totalizing-register is used has terminated. My improved cash register and indicator enables me thereby to indicate not only temporarily the exact amount of each sale to the purchaser, but furnishes, also, a permanent totalizing-register of all the sales made since the machine has gone into use and a temporary totalizing-register of the sales made within a determined period of time. This has the advantage that by the permanent totalizing-register a continuous check is exerted on all sales that are made and registered by machine, which register cannot be changed or tampered with, while at the same time the amount of sales made within certain periods of time are independently and temporarily registered, so as to control the cash in the drawers. In addition to the keys by which the dials are operated the change-key C' is used, which operates the registering-dial $C^2$ by means of a spring-pawl $C^3$, (shown in Figs. 1, 2, and 3,) which engage the teeth of the dial C². The lever of the change-key C' is provided at its rear end with a cross-pin C⁴, which is shown in dotted lines in Figs. 1 and 3 and in full lines in Fig. 5, and which engages the adjacent side bars D' of both coupling-frames D, so that both cash-drawers are opened simultaneously at each depression of the change-key lever and the alarm-bells sounded by the action of the toothed arm E and hammer e'. After change is made the drawers are closed again, the spring-pawl C³ engaging the next tooth of the registering-wheel, so as to turn at the next depression of the change-key and register thereby the number of times for which change was made, the change-registering dial and the alarm sounded by the change-key serving as an auxiliary check for the working of the machine.

Having thus described my invention, I claim as new and desire to secure by Letters Patent—

1. The combination of a series of fulcrumed key-levers, a coupling-frame pivoted to the fulcrum of the key-levers, fulcrumed elbow-levers provided with stops at their upper arms and a push-roller at their lower arms, pivot-links connecting the coupling-frame with said elbow-levers, and a cash-drawer provided with fixed abutments at the side walls that are engaged by the stops when the key-levers are in normal position, but cleared by the same when one or more of the key-levers are raised, substantially as set forth.

2. The combination of a series of fulcrumed key-levers having notched rear ends, a coupling-frame operated by said key-levers, said coupling-frame being provided with an oscillating rear bar, an upright toothed and spring-actuated arm pressing on said rear bar, and a transverse locking-bar on said arm, said rear arm locking the raised key lever or levers and the locking-bar the remaining key-levers, substantially as set forth.

3. The combination of a series of fulcrumed key-levers, a coupling-frame pivoted to the fulcrum of the key-levers, said coupling-frame being provided with a pivoted rear bar and with a transverse bar connecting the side bars of the coupling-frame, an inclined abutment by which the rear bar is oscillated in backward direction, a spring-actuated pivoted and toothed arm that presses on the rear bar of the coupling-frame, and a transverse locking-bar on said arm, substantially as set forth.

4. The combination of a series of fulcrumed key-levers having notched rear ends, a coupling-frame pivoted to the fulcrum of the key-levers, a fixed transverse bar connecting the side bars of the coupling-frame and extending over the key-levers, a pivoted bar at the rear part of the coupling-frame, and a spring-actuated and toothed arm pivoted to the supporting-frame and provided with a stop at the upper end, said toothed arm pressing the pivoted rear bar of the coupling-frame into the notched rear ends of the raised key lever or levers, so as to lock the same in raised position, substantially as set forth.

5. The combination of a series of fulcrumed key-levers having notched rear ends, a coupling-frame pivoted to the fulcrum of said key-levers and composed of side bars, a transverse connecting-bar and a pivoted rear bar, an upright pivoted and toothed arm having a stop at the upper end, a transverse locking-bar on said arm, a spring for pressing the toothed arm on the pivoted rear bar of the coupling-frame, and an inclined abutment for oscillating said rear bar, so as to withdraw it and the locking-bar from the notched rear ends of the key-levers, substantially as set forth.

6. The combination, with a series of fulcrumed key-levers, of a coupling-frame composed of side bars pivoted to the fulcrum of the key-levers, a fixed transverse connecting-bar and a pivoted rear bar, a fixed abutment on the supporting-frame, an upright toothed arm pivoted to said supporting-frame, a transverse locking-bar applied to said toothed bar, a spring applied to the toothed arm, so as to hold it in contact with the rear bar of the coupling-frame until the rear arm is moved by the abutment in backward direction, and an alarm device operated by the toothed arm at each operation of a key-lever, substantially as set forth.

7. The combination, with a series of fulcrumed key-levers, of a step-shaped block suspended transversely above said key-levers, a spirally-grooved spindle above said block, a sliding nut on said spindle, said nut engaging the groove of said spindle, an intermediate fulcrumed elbow-lever connecting the pivot-shaft of the block with the sliding nut, indicating and registering dials placed loosely on said spindle, means for moving the dials axially with the spindle in one direction, and means for locking them in position when the spindle is returned into its normal position, substantially as set forth.

8. The combination, with a series of key-levers applied to a common fulcrum, of a coupling-frame pivoted to the fulcrum of the key-levers and provided with arc-shaped and slotted guide-arms, a step-shaped block arranged transversely above said keys and provided with pins extending into said guide-arms, a spirally-grooved spindle supported in bearings above the step-shaped block, intermediate mechanism between the step-shaped block and the spindle, by which an axial motion is imparted to said spindle in proportion to the oscillating motion imparted to the step-shaped block by the key-levers, and indicating and registering dials applied to said spindle, substantially as set forth.

9. The combination, with a series of fulcrumed key-levers, of a step-shaped block supported transversely above said key-levers, a spirally-grooved spindle supported above said step-shaped block, a sliding nut engaging the spiral groove of said spindle, an intermediate fulcrumed elbow-lever connected at the lower end to arms of the step-shaped block and at the upper end to said nut, and a check-frame by which the nut and spindle are retained at the point to which they are set by the raised key-lever, substantially as set forth.

10. The combination of a series of key-levers, a spirally-grooved spindle, intermediate mechanism between the key-levers and spindle, by which axial motion is imparted to the latter, a temporary indicating-dial applied loosely to said spindle, means for moving said dial in one direction with the spindle, a spring for returning the dial in opposite direction, a check-pawl engaging recesses in the circumference of the dial, and means for withdrawing said check-pawl, so as to permit the turning of the dial with the spindle and the re-engagement of said dial by the check-pawl on the return of the operating key-lever, substantially as set forth.

11. The combination, with a series of fulcrumed key-levers, of a coupling-frame pivoted to the fulcrum of the key-levers, a fixed tooth applied to said coupling-frame, an indicating-dial having recesses in its circumference, intermediate mechanism for turning said dial by the action of one of the key-levers, a horizontally-movable and spring-actuated bar having stops adapted to engage the recesses of said dial, an upright arm pivoted to the horizontal bar and to the supporting-frame, a tapering projection on said arm, and a push-pawl on the coupling-frame for withdrawing the stops from the dial whenever a keylever and the coupling-frame are raised and locking said dial when the key-lever and coupling-frame are returned to their former position, substantially as set forth.

12. The combination, with a series of fulcrumed key-levers, of an axially-rotary spindle, mechanism between the key-levers and the spindle for axially turning the latter, registering-dials applied loosely to said spindle and provided with projecting pins at their adjoining faces, a pawl pivoted to a lug on said spindle and adapted to engage simultaneously the projecting teeth of both dials, so as to turn the same in one direction with the spindle, and a check-pawl adapted to engage the toothed circumference of said dials, so as to prevent them from returning with the spindle, substantially as set forth.

13. The combination of a series of fulcrumed key-levers, a rotary spindle mechanism between the key-levers and the spindle for axially rotating the latter, a totalizing-dial placed loosely on said spindle, a pawl-and-ratchet device for turning the dial with the spindle in one direction, a check device for locking the dial and preventing its turning with the spindle in opposite direction, elbow-levers on said spindle, push-pawls on said elbow-levers adapted to engage the toothed circumference of the dial, a stop on one dial for operating the elbow-lever of the adjacent dial after each full rotation of the first dial, and means operated by the key-levers for operating the push-pawl and move the last dial for the distance of one tooth when the first dial has completed its rotation, substantially as set forth.

14. The combination of a series of fulcrumed key-levers, axially-rotating spindles, a totalizing-dial placed loosely on said spindle, a pawl pivoted to a lug on said spindle for engaging projecting pins on said dial, a check-pawl adapted to engage the toothed circumference of the dial and retain the same when the spindle is moved in opposite direction, a projecting stop on one dial, an elbow-shaped lever applied loosely to the spindle of the next adjacent dial, a push-pawl applied to the lower arm of said elbow-lever and adapted to engage the toothed circumference of the second dial, a shaft having spirally-bent wings or flanges adapted to operate said push-pawl, and means operated by the key-levers for turning said shaft, so as to move the dial for a distance of one tooth when the first dial has completed its rotation, substantially as set forth.

15. The combination of a series of key-levers, a coupling-frame pivoted to the fulcrum of said key-levers, elbow-levers connected to said coupling-frame and provided with toothed segments at their front ends, rotary spindles supported above the key-levers, intermediate mechanism between the key-levers and the spindles for imparting axial motion to the latter, totalizing-dials applied loosely to said spindles, means for moving the dials in one direction with the spindles, check-pawls adapted to prevent the dials from being moved in opposite direction with the spindles, projections on said dials, intermediate elbow-levers on said spindles, push-pawls applied to the lower ends of the elbow-levers, a shaft extending longitudinally below the push-pawl, spirally-bent wings on said shaft adapted to engage the push-pawls, and pinions on the ends of the shaft, said pinions meshing with the segments operated by the coupling-frame, so as to turn the shaft and actuate the push-pawls, substantially as set forth.

16. The combination, with a series of fulcrumed key-levers, of a coupling-frame pivoted to the fulcrum of the key-levers, a fulcrumed elbow-lever connected to the coupling-frame and provided with a toothed segment at its front end, a transverse shaft having wing-shaped flanges, pinions on said shaft meshing with said segments, axially-turning spindles, mechanism between said spindles and the key-levers for imparting axial motion to the same, registering-dials placed loosely on said spindles, means for moving the dials and their spindles in one direction, check-pawls for preventing the return motion of the dials when the spindles are moved in opposite direction, and transferring mechanism by which each full rotation of one dial is registered on the next adjacent dial by the action of the flanges on the transferring-shaft, substantially as set forth.

17. The combination of a series of fulcrumed key-levers, axially-rotated spindles, mechanism between the key-levers and spindles for transmitting axially rotary motion to the latter, two totalizing-dials applied loosely to said spindles, means for moving said totalizing-dials in one direction with the spindles, check-devices for preventing the return motion of said dials when the spindles are moved in opposite direction, and means whereby one of said dials on each spindle can be returned to zero independently of the permanent totalizing-dial, so as to form a temporary totalizing-register for any desired period of time, substantially as set forth.

In testimony that I claim the foregoing as my invention I have signed my name in presence of two subscribing witnesses.

ELISEO DEL VALLE.

Witnesses:
PAUL GOEPEL,
CHARLES SCHROEDER.